Dec. 24, 1940.  P. M. DOLAN  2,226,525
METHOD AND APPARATUS FOR REDUCING CHEMICALS
Filed April 28, 1937   3 Sheets-Sheet 1

INVENTOR
PAUL M. DOLAN
BY
ATTORNEYS

INVENTOR
PAUL M. DOLAN
ATTORNEYS

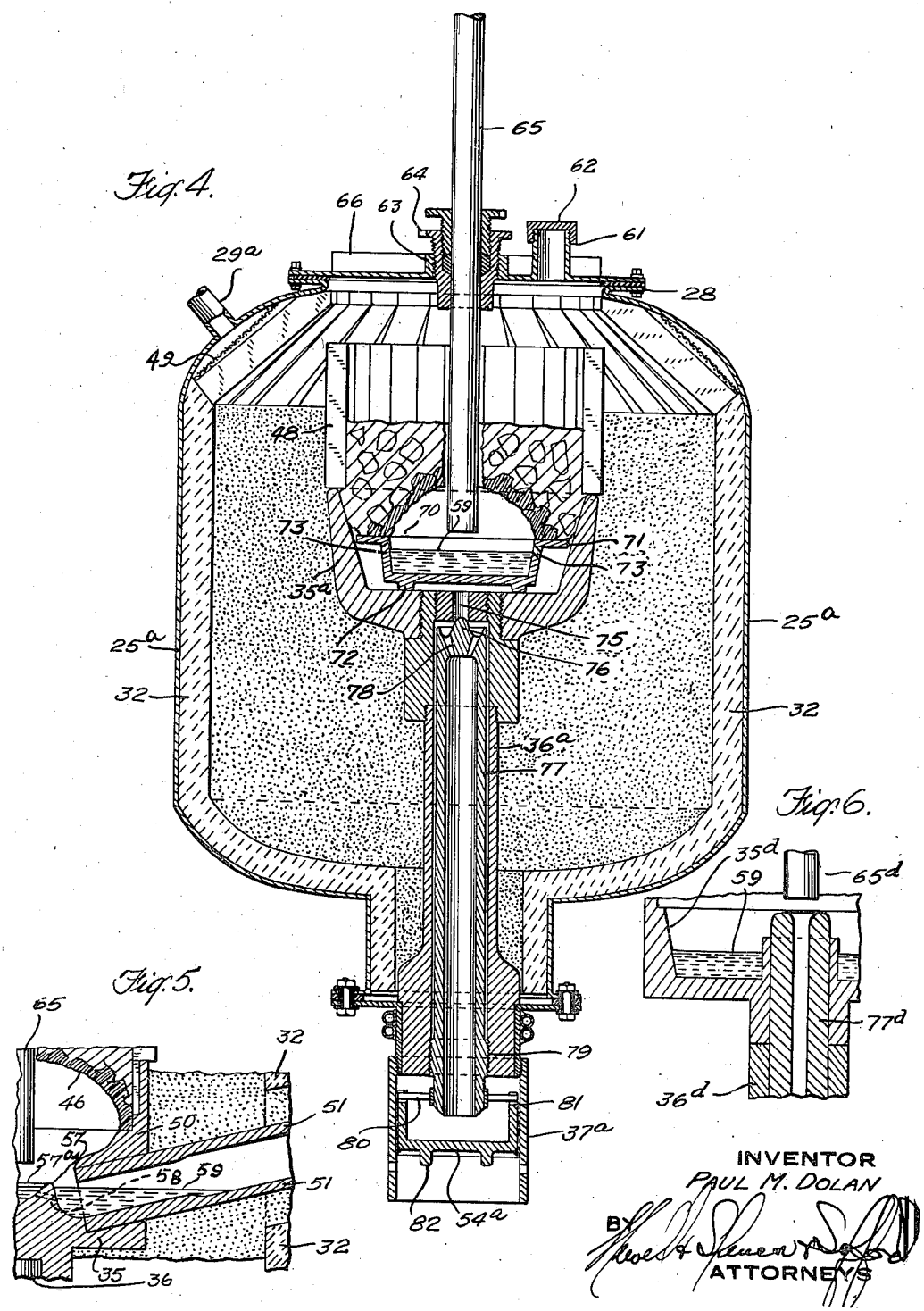

Patented Dec. 24, 1940

2,226,525

UNITED STATES PATENT OFFICE 2,226,525

METHOD AND APPARATUS FOR REDUCING CHEMICALS

Paul M. Dolan, Deer Park, N. Y., assignor of one-half to James C. Hartley, Brooklyn, N. Y.

Application April 28, 1937, Serial No. 139,607

32 Claims. (Cl. 75—10)

This invention relates to the method of and apparatus for reducing oxidized compounds of metal to produce metallic substances. More particularly the invention relates to a reduction of oxidized compounds of metal by means of atomic hydrogen.

Although the art of metallurgy has developed to a point at which most metals can now be reduced and at relatively low cost there are still a few metals, of which beryllium is an outstanding example, which can be obtained only at high prices and in relatively small amounts because of the difficulties of recovering the metals as such from their compounds which occur in nature.

Accordingly, it is one object of the present invention to provide a method and apparatus by which such difficultly reducible metals can be produced readily and at relatively low cost.

Another object of the invention is to provide an apparatus particularly adapted to the reduction of oxidized compounds of such metal by means of gaseous reducing agents.

Other objects of the invention will be evident to those skilled in the art from the following description and the accompanying drawings.

It has been known for some time prior to my invention that certain molecular gases, especially hydrogen, may be dissociated to a greater or less extent into atomic state with conversion of thermal energy into potential chemical energy, which can be again released as heat upon recombination of the atoms in the gas. This principle has been used primarily for welding, but it has also been suggested for heating metallurgical furnaces.

I have now discovered that the more refractory oxides such as beryllium oxide, can be reduced by direct action of atomic hydrogen without release of the potential energy of its chemical state, but on the contrary utilizing this potential energy directly in the reduction reaction. I have found, moreover, that it is especially desirable that excessive development of heat in the furnace should be avoided so far as possible, in order to avoid fusion of the oxides or other material being reduced, and to permit them to be exposed as finely divided solids, with as great a surface area as possible, to the action of the reducing gas. For this reason it is best to feed the oxide gradually into the reaction zone at a rate about equal to that at which it is consumed in the reaction. The oxide may be fed from a preheating zone farther away where there is no danger of fusion.

In order to utilize fully in the reduction the potential energy of recombination, I have found it advantageous to have the dissociating zone (ordinarily an electric arc) so close to the material being reduced that the atomic hydrogen formed in the arc will come into contact with said material before recombination occurs; and for best results I advantageously regulate conditions so that as much as possible of the energy of the arc or other energy supplying device is absorbed by dissociation of the gas and as little as possible is consumed in fusion of the material being reduced. Finally, I have found it advantageous to have the gas as free as possible from other materials such as oxygen with which the hydrogen might combine to produce excessive heat or which may shift the equilibrium of the reduction reaction toward reversal.

In dealing with metals such as beryllium which are readily reoxidized it is important to remove the water vapor formed by the reduction reaction as quickly and completely as possible from the metal formed at the same time. This can be achieved either by mechanically separating the vapor or by fixing it in a chemically unreactive form, or by chemically transforming it to a compound unreactive with the reduced metal. Thus I have found that it is desirable to have in the flow a substantial excess of molecular hydrogen beyond that which can be converted into atomic hydrogen, so that in the gases which pass away from the reducing zone the water vapor will be in relatively low concentration and, therefore, less likely to recombine with the reduced metal. The rate of supply of hydrogen, however, must not be so high as to cool the arc zone below the temperature of formation of atomic hydrogen (1700° C., at atmospheric pressure).

Alloying metals may be supplied as such or produced in the furnace by mixing with the charge compounds of such metals which are reduced by the hydrogen, especially of a metal which is released by molecular hydrogen in the zone above the beryllium reduction zone.

In the accompanying drawings I have represented diagrammatically a preferred process and apparatus embodying my invention. It should be understood, however, that these and the description given below are not intended to be exhaustive or limiting of the invention, but on the contrary are chosen for purposes of illustration and explanation so that others skilled in the art may fully understand the invention and the principles thereof and will be able without difficulty to apply it in numerous and various forms and with numerous modifications according to the requirements and conditions of each case in which the invention is to be used.

In the drawings:

Fig. 4 is a view similar to Fig. 3 but showing a modified form of the furnace; and Figs. 5 and 6 are fragmentary sectional views of modifications which may be used in the construction of Fig. 3.

Figure 1:
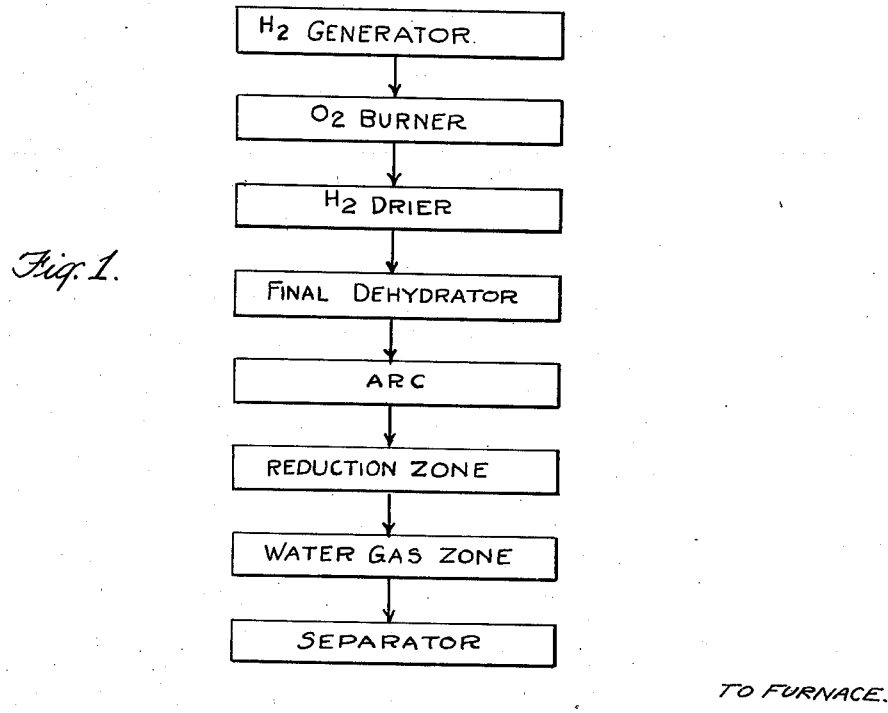
Fig. 1 is a flow sheet of a process embodying my invention.

Referring first to Fig. 1, I have there set forth in the form of a flow sheet the successive steps of a process for producing metals by atomic hydrogen reduction of oxide compounds according to my invention.

The hydrogen gas is produced in any of the customary ways, for example, as a by-product from electrolytic cells. This gas ordinarily contains some water vapor and some uncombined oxygen, both of which I have found to be objectionable in the atomic hydrogen reduction process. According to my invention, therefore, the gas is first treated to react any uncombined oxygen with the hydrogen thereby producing additional water vapor in the hydrogen gas. For this purpose the gas may be passed over a catalyst or over a heated surface at a temperature sufficiently high to effect the combination of oxygen and hydrogen.

Suitable catalysts include platinum black and many of the more recently developed catalysts of the artificial zeolite or exchangeable base type.

Figure 2:
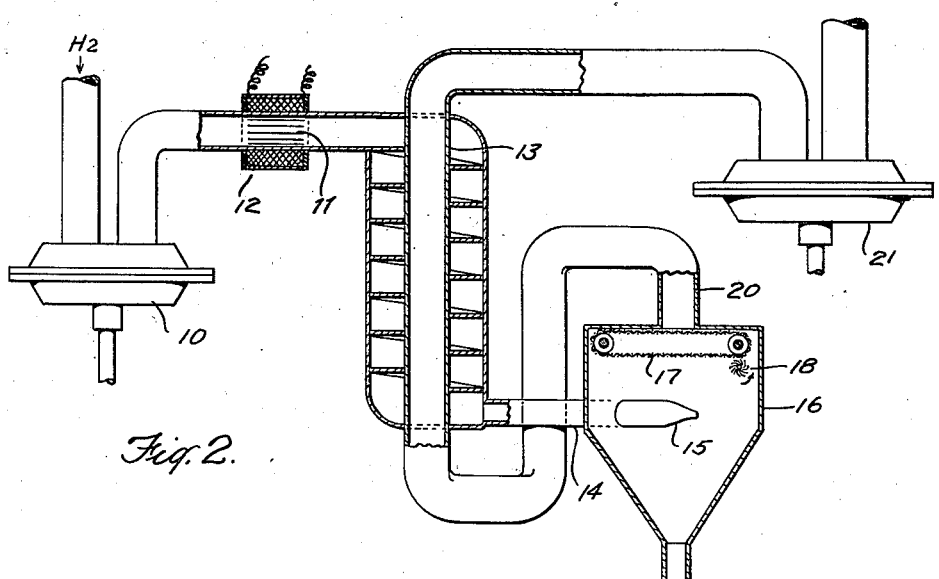
Fig. 2 is a diagrammatic illustration showing an apparatus adapted for purifying and dehydrating the gas used in the process.

After all oxygen has been combined with the hydrogen, the gas is treated for the removal of water vapor by chemical or physical absorption or by physical treatment of the gases or by any other well known methods of separating gases and vapor. Fig. 2 shows one example of such treatment.

Other impurities, e. g., nitrogen, although not directly injurious, should be avoided because their heating and/or dissociation impair efficiency by useless consumption of heat.

As there illustrated the hydrogen gas from the electrolytic cell or other source is compressed at 10. The compressed gas is passed through a roll of copper screen 11 which is heated by the electrical heater 12 surrounding the conduit to a temperature at least about 300° C. and preferably 1000° C. The gas, partly cooled by exposure in the pipe 9, encounters a counter-current heat-exchange column 13 in which it is baffled or spiralled back and forth with gradual cooling by heat-exchange to the cold gases passing up through the inner passages of the column.

At 14 the cold compressed gases leave the exchange column cold and pass through the expansion valve 15 into the snow separation chamber 16. The further chilling of the gas by the physical effect of the expansion converts into snow any water vapor existing in the gas. This snow is separated out by the cyclone effect and also by the filter belt 17 which may be continuously cleaned, e. g., by a rotary brush 18. The temperature and pressure differences at expansion are regulated so that substantially all of the vapor condensation occurs as dry snow so as to avoid frosting difficulties.

From the separator 16 the gas passes at reduced pressure back through the vertical heat-exchange column 13; and, if desired, through a compressor or suction pump 21 and on to the reduction furnace, advantageously with a final dehydration with chemical driers.

The compressor 21, if used, is preferably of the diaphragm type or of the type having its piston submerged in mercury or hydrocarbon oil to avoid any possibility of further contamination of the hydrogen by air or water vapor, etc.

The compressor 21 may be eliminated if the gas is compressed to a higher pressure at 10 and is then released in the chamber 16 only to such pressure as is desired in the furnace. This has the advantage of permitting fully sealed conduits for the purified hydrogen, eliminating all possibility of contamination.

Instead of or in addition to this direct compression and expansion of the gas, I may pass the gas over a refrigerator at a temperature sufficiently low to precipitate all moisture as frost. Thus the gas may pass first over the evaporator coils of a compressor or absorption type refrigerator and then over the condenser or absorber coils; moisture is precipitated in the first step and the gases reheated in the second step.

It is possible by a cooling and/or compressing treatment of this kind to reduce the water vapor content to the extent required for the furnace operation. Ordinarily, however, it is not economical to do so and this treatment will be used only to remove the bulk of the water, e. g., down to about 1 mg./l. or less, and the further reduction, e. g., down to about ½ mg./l. or less, will be effected by chemical absorbents, such for example, as anhydrous calcium sulphate, now commercially sold under the trade name "Drierite." Other anhydrous chemicals may be used for this purpose, as $BaO$, $H_2SO_4$, $Al_2O_3$, $MgO$, $NaOH$, etc.

Where calcium sulphate is used as the drying agent or any other material which may act as a flux for the beryllium oxide, or other material being reduced in the furnace, it is important that the apparatus should be so designed as to avoid entraining any of the drying agent in the stream of gas; or if that is not practicable, to provide some subsequent separator in order to assure that no such fluxing action will occur within the furnace.

I have found that a very small amount of water vapor between 0.2 and 0.5 mg./l. is not objectionable. As the amount is increased, however, beyond one-half milligram per liter, seriously objectionable effects begin to appear, e. g., the yield of the furnace and strength of the alloy may become irregular and undependable unless temperature of entire reaction zone is raised above dissociation temperature of water.

The hydrogen thus dried is fed into the reducing furnace, where it passes first through the highly heated zone in the immediate vicinity of the arc. In this zone the energy from the arc is absorbed by the hydrogen and is converted into potential energy as the hydrogen is dissociated.

The relationship between rate of flow of the hydrogen and the loading of the arc is important. If with a given rate of flow there is too great a loading of the arc there may be excessive heating of the oxidized material with excessive fusion and inefficient utilization of atomic hydrogen because of the high concentration of water vapor formed by the reducing reaction and consequent reoxidation of reduced metal. The oxide compounds thus newly formed may be deposited in the interstices of the charge with objectionable effects somewhat similar to those resulting from excessive fusion.

If the energy loading of the arc with a given rate of flow of hydrogen is too low the capacity of the furnace will be reduced and the furnace may be excessively cooled. In general, however, it is better to err on the side of too high a rate of flow than too low so long as the loading is sufficient to produce atomic hydrogen, and with sufficient flow of hydrogen it is better to have too high an energy loading of the arc than too low.

Figure 3:
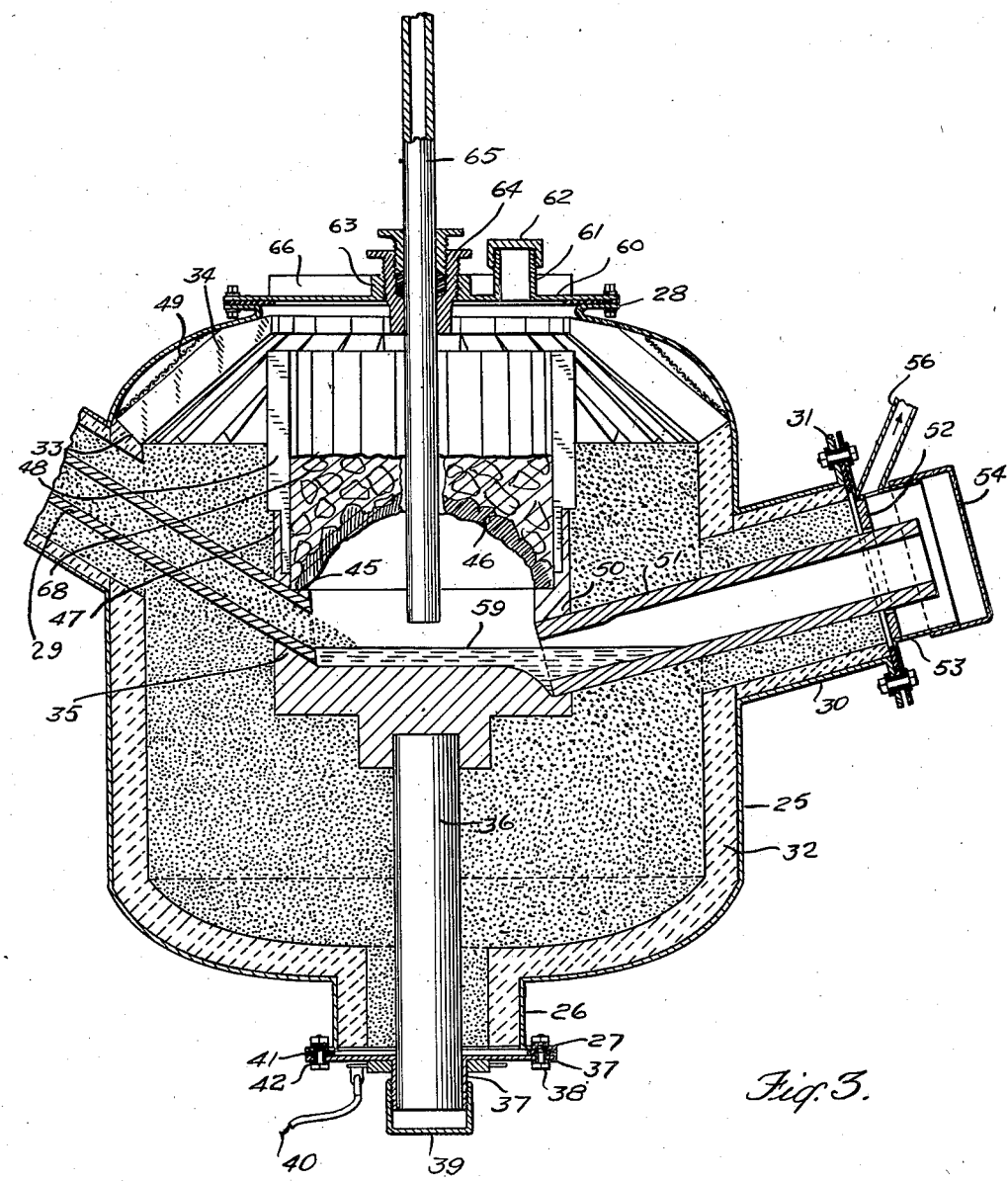
Fig. 3 is a view in vertical section of a furnace particularly adapted for reduction according to the present invention.

With a furnace designed as shown in Fig. 3 or 4 an energy loading of 600 amperes with 80 volts across the arc drawn from a D. C. line of voltage about 150 volts to 260 volts with suitable ballast, and 5 cubic feet per minute of hydrogen at 4 lbs. per square inch gauge pressure have been found suitable. This same furnace with a loading from 25-50 kw. may be operated with good results with a hydrogen flow of one cubic foot per minute to 10 cubic feet per minute, but better results are obtained with the higher than with the lower rates of flow.

With the higher rate of flow preheating of the gas is desirable in order that the convection effect of the gas passing through the arc does not excessively cool the furnace.

As a general rule when the beryllium oxide is held in close proximity to the arc, as shown for example, in Figs. 3 and 4, the arc loading should be at least about 2.5 kilowatts per cubic foot of hydrogen per minute. This rule, however, depends to some extent upon furnace design, particularly upon the distance between the arc and the reducing surfaces of the charge and upon the efficiency of atomic hydrogen formation in the arc. If conditions are changed to improve the efficiency of formation of atomic hydrogen, then the loading of the arc for a given hydrogen flow may be increased. In any case the loading of the arc should be above the minimum required for arc stability.

The pressure of the hydrogen also has an influence. In the first place, because of its higher density the gas at higher pressure permits a lower rate of flow in cubic feet per minute to maintain approximately the same number of molecules per minute. There is advantage in having a moderate high pressure in the furnace; e. g., with pressure between one and five pounds per square inch gauge, any minute leaks in the furnace will result in escape of hydrogen, which is relatively unimportant, and danger of oxygen leaking into the reaction zone is avoided. Pressure also has an influence, as is well understood, on the equilibrium point of these reactions in the gaseous phase, and also upon the extent to which the beryllium and alloying metal may be volatilized. With the simpler furnace design, however, such advantages as may result from high pressure are out-weighed by the difficulties of keeping the furnace gas tight against leakage of the hydrogen.

At the other extreme of pressure, advantage may be found with pressures in the range of 10-100 mm., e. g., about 20 mm. mercury column, especially since in that range the arc can become dispersed and thereby produce more complete dissociation of the hydrogen which is passed through it; and, furthermore, the low pressure favors the dissociation in the equilibrium between molecular and atomic hydrogen and in the reduction reaction. The maintenance of such low pressures without leakage of atmospheric oxygen into the furnace, however, presents such difficulty that in most cases it will be more economical to use the low super-atmospheric pressure than the very low pressure.

Since the reaction takes place between a solid, e. g., beryllium oxide, and a gas, e. g., hydrogen, it is advantageous to have the solid exposed to contact with the gas over as great a surface area as possible. Beryllium oxide as ordinarily used in my process is a light fluffy powder. In this there is a very great surface per unit of weight. In order to avoid entraining the powder in the flow of gas and producing channels through the mass where the flow of the gas would tend to concentrate to the exclusion of other parts, in which, therefore, the surface would not be utilized, I may compress this light powder into briquettes, e. g., of about one inch to one and one-half inches across; and these are then exposed substantially without fusion to reduction in the space over and surrounding the arc. If the loading of the arc and the rate of flow of the hydrogen is properly regulated, these briquettes will, as described above, be consumed by the reduction process substantially without fusion or with only incipient fusion or sintering of a thin layer along the under side of the arch formed by the briquettes. Thus, no part becomes closed by glazing and there is little tendency for channeling; but on the contrary, most efficient use is made of the exposed surface of the beryllium oxide.

Thus far I have referred to the reduction of oxidized compounds by my process, without referring to the recovery of the reduced metal. With some metals this will not present any difficult problem; and, especially with metals which are not excessively volatile at the temperature at which the reduction occurs, the metal may be merely allowed to flow down into a pool from which it is tapped from time to time. In the case of beryllium, however, the metal is released as a vapor, and it is an important part of the process to recover the vapor in a form which can be commercially suitable.

It is possible to condense the vapors of the reduced metal immediately or after being conveyed some distance. This I accomplish preferably by alloying them in a suitable metal. It is not advisable, however, to convey the vapors any great distance from the reaction zone, because of the tendency of the metallic beryllium in these vapors to recombine with the water vapor.

In order to remove the reduced metal from the gases leaving the reaction zone as quickly as possible, I have combined with the charge of reducible compounds a supply of metal capable of alloying with the beryllium, and the alloy of which is desired as a final commercial product. As this alloying metal flows down over the charge to the hearth, it picks up the reduced beryllium from the vapors and carries it as an alloy, wherein it is substantially protected from re-oxidation, toward the hearth in a direction opposite to the direction in which the water vapor and any other reaction products are carried off.

It is important also that the alloy in the case of copper includes the chemical compound CuBe and, in higher concentration alloys above 12% Be, $CuBe_3$. These being less volatile than either copper or beryllium remain in the liquid phase even under the arc.

One way of supplying the alloying metal charge is to comminute the metal and to mix it with the finely divided oxide compound before briquetting. Thus, for example, 11 lbs. of finely divided copper can be mixed with 1 lb. of powdered beryllium oxide and the two briquetted in an ordinary briquetting press and baked, e. g., at a temperature of about 1800° F.

If a beryllium bronze of high purity is desired, it is important to have the mold faces of the briquetting press made of copper or beryllium bronze in order to avoid impurities resulting from attrition of the briquetting molds.

Even with such alloying metals present in the reaction zone, however, a certain vapor pressure of the beryllium will exist and a certain amount of the beryllium will be carried off as vapor with the gaseous reaction products. If any part of this is to be recovered without reoxidization, and in any case if the alloying metal is not used, it is desirable to fix the oxygen as soon as possible in a form in which it will not re-oxidize the beryllium. This I have found may be accomplished by providing small amounts of carbon, sodium or other alkali metal or any suitable substance capable of reducing the water vapor and holding the oxygen in a compound not strongly reactive with beryllium. Although the greatest effects may be produced by the alkali metal, carbon ordinarily will be chosen because of its lower cost and because the carbon monoxide is more readily and effectively removed from the vicinity of the beryllium without reacting therewith.

The experience with carbon in the reduction of beryllium prior to my invention has not been encouraging, since it has been found that the carbon forms beryllium carbide. I have found, however, that the water gas reaction may be carried on at temperatures at which beryllium carbide does not form; and that if a small amount of carbon is included in the charge, e. g., by mixing with the beryllium oxide and copper before briquetting this carbon will be consumed by the water gas reaction while the charge is still above the reducing zone. The efficient utilization of atomic hydrogen and consequent avoiding of fusion of the charge also helps to avoid carbide formation.

The difficulties of carbide formation can be avoided also simply by careful proportioning of the amount of carbon to that of the oxide, since the beryllium carbide itself reacts with the water vapor. It is better to have the proportion of carbon slightly less than that which would be consumed by the water gas reaction; but it is an advantage of the process that it automatically takes care of some excess carbon, probably by formation of hydrocarbons when the carbide is decomposed.

To the extent that graphite or other carbon electrodes are used in the furnace and the gases from the reaction zone are passed along a part of the electrode which is sufficiently heated, this also may take part in the water gas reaction, but in general I prefer to keep the electrodes cool, e. g., by passing the incoming hydrogen through a central passage therein and to effect the water gas reaction by a controlled supply of carbon included with the charge. The presence of carbon also reduces the tendency of the charge to fuse by heat of the arc.

Although it is possible to collect the metallic beryllium as such, nevertheless, such a procedure is not to be recommended because at the present time there is almost no demand for pure metallic beryllium, and even the higher percentage alloys are in relatively little demand because of the difficulty of remelting without substantial losses of beryllium due to vaporization or oxidation.

Accordingly, I have designed the preferred form of my process and apparatus to yield an alloy of about 5-10% beryllium.

In Figs. 3 and 4, I have shown two examples of such an apparatus.

Referring first to Fig. 3, the furnace there shown is built within a gas tight steel shell 25. At its lower end the shell 25 is provided with a neck 26 terminating in a flange 27; and its upper end terminates in a water-cooled flange 28 surrounding a larger mouth. On one side is an inclined charging tube 29 which terminates in the hearth above the level of the molten metal, and on the opposite side a neck 30 terminating in a flange 31 serves to provide an offtake pipe for the used gases and also a pouring opening, as will be more fully described below.

The bottom and sides of this steel shell 25 are lined with a monolithic refractory 32. At its upper edge this lining 32 forms an angular shelf 33 upon which refractory bricks 34 rest at one end.

A crucible 35, in this case of graphite, is positioned centrally within the shell 25, and as shown is mounted on a graphite post 36 which in turn is brought through the neck 26 and is engaged in the metal cap 37 which closes the neck 26, being secured and clamped thereto by means of the bolts 38.

The central cylindrical portion of the cap 37 may be partially slotted and engaged by a slightly conical screw cap 39 which, upon being screwed over the end of the cap 37, serves at once to seal the latter end and to clamp it firmly against the graphite post 36, thereby making a secure and low resistance electrical contact between the cap 37 and the post 36.

A connection 40 is made to the cap 37 for the arc circuit which passes from the metal cap 37 through the post 36, the crucible 35, and through the arc to the upper graphite electrode. Unless the connection 40 is grounded the parts 37 and 39 should be insulated from the shell 26, e. g., by insulating washers 41 and 42.

The upper rim of the crucible 35 may be formed with a shelf 45, as shown in the drawings, to support an arch 46 in the material of the charge over the arc zone. Above this shelf an annular portion 47 supports a circle of beryllium oxide bricks 48. These bricks 48 support at their upper edge the inner ends of the bricks 34 and in turn are held together in cylindrical form by the pressure of the bricks 34.

On the side of the crucible 35 opposite to the charging tube 29 is an opening 50 into which a graphite tube 51 is fitted for pouring. This tube serves as an off-take for used gases during operation and as a pouring snout when the furnace is tapped. At its outer end the tube 51 is supported in the annular disc 52, e. g., of BeO in a cap 53 bolted to the flange 31. Over the end of the cap 53 and the tube 51 is tightly fitted a flask 54. A perforated portion of the cap 53 is surrounded by an annular manifold 55 which opens into the pipe 56, by which the off-take gases escape.

A cover plate 60 closes to the flange 28, and this cover plate has formed therein an opening 61 with a cap 62 screwed thereon. This opening may serve for inspection of the interior and for auxiliary charging of beryllium oxide. A boss 63 onto which the packing gland 64 is secured, provides for insertion of the hollow electrode 65 into the furnace.

In the preferred embodiment of my invention the electrode 65 is grounded to the furnace wall, so that it is not necessary to bother with insulation between the electrode and the wall 25 of the furnace in this hot upper zone. Even where this is done, however, it is advantageous to provide a water jacket 66 for cooling the cover plate 60.

The space between the crucible 35 and the bricks 48 on the one hand and the lining 32 and the bricks 34 on the other is filled with a suitable refractory, advantageously loose beryllium oxide shrunk to stable volume by preheating. This forms both a heat insulation and a barrier against chemical contamination of the charge in the furnace.

In the operation of this furnace the comminute charge, loose or briquetted, may be first charged in through the opening 61 to substantially fill the space within the circle of bricks 48.

The electrode 65 and the connection 40 are then connected to a suitable source of arc current and the electrode 65 moved down into contact with the copper in the crucible 35. When the arc is struck the electrode is maintained at a suitable spacing by means of an automatic electrode feeding device (not shown), which may be any one of the several types known to the art; and a current of bone-dry molecular hydrogen is fed in through the electrode, through the arc and into the charge of beryllium oxide as already described above.

After the furnace is thoroughly heated hydrogen is then passed in through the electrode 65 and flushed out through the furnace and through the off-take pipe 51 until the furnace is substantially completely free from air.

The operating charge is supplied through the tube 29 in loose form or as briquettes or even lumps of clinker from previous furnace runs. This material floats on the pool 59 of alloying metal and into close proximity to the arc, and also protects the surface of the pool to some extent from direct inpinging of the atomic hydrogen.

This charge, for example, may consist of 11 parts by weight, copper in finely divided form, one part by weight of beryllium oxide, and ½–1 part by weight of pure finely divided carbon. This mixture may be pressed into briquettes about 1½ inches in diameter, i. e., slightly less than the diameter of the tube 29, and the briquettes baked at a temperature of about 1800° F.

The first effect of the arc is to melt down the metallic copper in the bottom of the crucible 35 and to form a pool of molten metal which serves as the lower electrode of the arc. The second effect, as already described, is the dissociation of molecular hydrogen into atomic hydrogen, and this atomic hydrogen reacts directly with the beryllium oxide in the charge immediately surrounding the arc, converting it into metallic beryllium and water vapor.

The metallic beryllium alloys almost immediately with the copper which is included in the charge, and as this copper is fused and flows down through the charge to the pool 59 in the bottom of the crucible 35, it carries with it the reduced beryllium.

The gases from the reaction zone pass over the surface of the alloy pool and out through the tube 51. Advantageously the insulation of this tube is regulated so that throughout a large part of its length its temperature is such that the copper and beryllium vapors are condensed to liquid state so that the tube 51 in effect serves as a reflux condenser.

In order to operate most efficiently with such an arrangement and to avoid reoxidation of the beryllium at the surface of the alloy and in vapor form before it is condensed in the tube 51, it is desirable to eliminate water vapor as quickly as possible. This I have accomplished in this preferred example by the carbon or equivalent material supplied with the charge and carried thereby into the furnace. The water vapor formed by the hydrogen reduction reacts at once with the carbon to form water gas ($CO+H_2$), and thus the oxygen is carried off from the furnace without serious reoxidation of the beryllium.

The design of the furnace may be modified so as to segregate the arcing point from the pool of alloy which collects in the furnace and to keep the entire pool of alloy at the cooler temperature and preferably protected from the hydrogen flow, at least until the latter has contacted the beryllium oxide in the reducing zone. Thus, for example, an annular baffle 57 of graphite or beryllium oxide may surround the arc with only small holes 58 communicating with the pool of alloy. By means of this small communication a pool of metal 57a will be maintained to serve as the actual electrode, while the baffle serves to limit diffusion of beryllium into the copper in the electrode pool and above the pool it serves to direct the hydrogen gas toward the beryllium oxide charge and away from the alloy pool 59. This is shown, for example, in Fig. 5.

Advantageously also where a higher percentage alloy is required the crucible 35d may be made in annular form and a second graphite electrode 77d brought up through the bottom of the furnace within the sleeve 36d. This is shown in Fig. 6. In this case advantageously the lower electrode is hollow and serves to introduce the hydrogen, and the upper electrode 65d may either be solid or may also be hollow so that two streams of hydrogen impinge upon one another within the arc. In either case, the stream of hydrogen from the lower electrode may be made to direct the stream of atomic hydrogen from the arc upward away from the pool 59 and onto a beryllium oxide charge around and/or above the arc.

There is also advantage in using the charging tube 29 instead of the pouring tube 51 for offtake of gases, since in this case the charge in the tube serves to scrub the gases of any metal condensed by cooling of the vapors, and even uncondensed vapors of beryllium are adsorbed or dissolved or alloyed in the charge. Furthermore, the off-take gases serve to clean the charge of any traces of oxygen or moisture which it might otherwise carry into the reaction zone; and in case the alloying metal is supplied as a reducible compound, reduction thereof by molecular hydrogen may occur in this charging tube 29.

When this is done the charge should be compressed into briquettes of size and shape to fit into and slide along the tube 29, so that the tube is substantially filled with the charge.

With this counter-current scrubbing the loss of metal in the exhaust is reduced to very small proportions. When, however, the amount of metal in the gas is important it may be collected, after cooling of the gases, by electrical precipitation or by scrubbing the gases through a pool of molten copper or other alloying metal; or the gases may be scrubbed with water or a chemical solution from which the metals will be recovered, largely in chemical combination.

After a period of operation sufficient to collect a substantial pool of metal in the crucible 35, the furnace is tilted toward the pouring spout 51, whereupon the metal runs through this spout and into the mold cap 54. The latter is cool so that the metal soon solidifies, whereupon the furnace is returned to its upright position and the mold 54 removed with its solidified ingot and another mold cap 54 put in its place. This change is preferably made while a hydrogen pressure slightly above atmospheric is maintained in the furnace so that upon removal of the ingot mold 54 the escaping hydrogen will prevent any oxygen from returning back into the furnace. This result may also be obtained by use of mechanical conveyors for removing the ingot mold and replacing it with a new one within a closed chamber provided with an atmosphere of hydrogen. Such a chamber may, for example, be flushed with exhaust hydrogen from the furnace.

Except for this tilting of the furnace and replacing of ingot molds and for the feeding of additional materials, e. g., in briquette form through the charging tube 29 or 61, the operation of the furnace may be substantially continuous. As the operation proceeds the beryllium oxide arch above the reaction zone may be consumed back away from the arc; and additional material should in that case be supplied through the opening 61 and fed down toward the arc. The arch in the material may hold too rigidly or too long so that the charge above does not settle down as desired; and in such case it may be necessary to break through the arch 46 and to drive the material down closer to the arc. This may be done by inserting a tamping rod through the charging opening 61 or a special tamping rod with its own opening may be provided for that purpose. Ordinarily, however, the reciprocating action of the electrode 65 as it is adjusted to maintain the required voltage on the arc will provide the necessary disturbance to keep the charge settling to about the proper height.

The charge for feeding the normal operation of the furnace is, as already stated, supplied through the tube 29.

As dimensions for a small scale commercial furnace of the design shown in Fig. 3, the crucible 35 may, for example, be about 14 inches in diameter and the inside of the shelf 45 about 10 inches in diameter, the electrode 65 about 3 inches in diameter and with a central bore for feeding the hydrogen therethrough about 3/4 of an inch in diameter. The other dimensions may be roughly in the proportions shown in the drawings.

In the operation of the furnace having these dimensions the arc may be operated, for example, from a 120-160 volt line (or higher) ballasted so that the arc itself consumes about 80 volts with a current of 400 to 600 amperes. The electrode feeding device is set to feed down the electrode when the voltage rises to 100 volts and to stop when the voltage is decreased to 75 volts.

With a D. C. current the graphite electrode 65 is connected as the anode and the pool 59 as the cathode, or vice-versa, but advantageously as stated, since with this arrangement any ionized beryllium tends to be deposited by electrolytic action on the pool 59. Furthermore, since the anode drop is ordinarily higher than the cathode drop in the arc, the heating of the pool 59 with such an arrangement is less than if the pool 59 serves as the anode. When A. C. current is used, these considerations, of course, become unimportant.

It is an advantage of A. C. operation that reactance ballast may be used with relatively low power loss. Where alternating current is available this advantage may be combined with the advantages of direct current by using a mercury arc rectifier in a conventional center tapped transformer circuit but with the transformer designed to give sufficient reactance for ballasting or with reactors in a part of the circuit subjected to pulsating or alternating current.

The arc voltage may also be maintained by use of a grid controlled rectifier tube with the grid biased across the arc.

The hydrogen is fed into the furnace operating with such loading at a rate of about 6 cubic feet per minute or more and at a pressure about 4 pounds gauge, and the hydrogen before being supplied to the arc is dried to about 0.2 mg. l. water vapor.

The furnace in this example would, for example, be charged with briquettes containing beryllium oxide, carbon and copper in the proportions 1 to 0.5 to 11, by weight.

These figures, of course, are given only by way of example and may be varied substantially according to the furnace design, the percentage of alloy desired and other conditions of operation.

With the loading and hydrogen flow as described and in the furnace illustrated in Fig. 3 the beryllium oxide, with the possible exception of a very thin layer along the surface 46 exposed to the radiant heat of the arc, is kept substantially below its fusion temperature, and any cumulative formation of beryllium carbide is avoided.

In Fig. 4, I have shown another embodiment of my invention. In this case the shell 25a, its lining, its end cap and the inner furnace formed by the blocks 48 and the crucible 35a are substantially similar to that shown in Fig. 3. The form of the crucible 35a, however, is altered; instead of the pouring spout 51 provision is made for tapping of the furnace through the bottom of the crucible and the hollow post 36a; and instead of the charging and off-take tube 29, an off-take pipe 29a is provided with the wire mesh 49 to hold back entrained powdery material from the furnace.

Within the crucible 35a is provided an inner hearth 70 spaced from the sides of the crucible by the rim 71 and from the bottom by the feet 72. Beneath the rim 71 are openings 73 through which excess metal drains from the hearth 70 into the bottom of the crucible 35a. The rim 71 serves like the shell 45 shown in Fig. 3 to hold the arch of beryllium oxide or other material which is being reduced; and the pool 59 of metal maintained on the hearth 70 serves as one electrode exactly as in the case illustrated in Fig. 3.

At the center of the crucible 35a is an opening 75 which is controlled by a valve plug 76 on the end of the hollow tube 77. The upper end of this tube 77 is formed with an annular channel, as shown in the drawings, so that the metal coming through the opening 75 will flow into the center of the tube 77 through the opening 78 and will not flow into the space between the tube 77 and the inside of the crucible 35a or the supporting post 36a where it might remain until after the pouring operation and by freezing prevent the further opening or closing of the valve.

At its bottom the tube 77 is threaded into the bottom of the post 36a as shown at 79.

Below the threaded portion 79 the tube is provided with operating pins 80 which engage in notches 81 in the top of an ingot mold 54a, which is received within the end of the cap 37a. Lugs 82 are provided on the bottom of the ingot mold 54a whereby the valve 76 can be operated without opening the ingot mold to the atmosphere.

This furnace may be operated in substantially the same way as the furnace shown in Fig. 3 except that charging is effected entirely through the opening 61, and as the metal collects on the hearth 70, instead of building up the level of the pool 52 prior to tapping of the furnace, the excess drains off through the holes 73 into the crucible 35a, and this excess is tapped from time to time without tilting the furnace or interrupting its operation.

The tapping may be effected by fitting a suitable wrench to the lugs 82 on the bottom of the ingot mold 54a and by rotating the mold opening the valve through the agency of the pins 80 and the notches 81. As the valve 76 is withdrawn from its seat in the opening 75 the excess metal runs down through the opening 78 and the bore of the tube 77 and into the ingot mold 54a. When the tapping is completed the valve is again screwed into tight engagement with its seat and the sleeve 37a is unscrewed to remove the ingot in the mold 54a.

It is one advantage of the form shown in Fig. 4 that the level of the pool 59 is maintained at all times. In Fig. 5, I have shown a modification of the form of crucible used in Fig. 3 which is designed more particularly to obtain this advantage. In this form the pouring spout 51 projects into the crucible so that when the furnace is tipped a certain amount of the metal will collect in the crucible around the outside of the pouring tube 51 and this metal will flow back into the bottom of the crucible when the furnace is returned to its upright position.

I have shown the valve 75—76—77 in order to keep the alloy molten in the furnace until a sufficient amount has collected to fill the ingot mold. It should be understood, however, that this construction is not essential and that a continuous tapping may be provided for by simply omitting the valve and allowing the excess metal which overflows from the pool 59 to drain down into the ingot mold. A new ingot mold would be substituted as one becomes filled, and by maintaining a proper temperature around the ingot mold the solidification of the metal may be delayed so that even with a relatively slow trickle a satisfactory dense ingot will be formed. Particularly where the charge is fed continuously as already described in connection with Fig. 3 and the electrodes are fed continuously, e. g., by providing them with threaded ends and screwing a new section onto the old as one becomes consumed by the arc, a continuous operation of the furnace may be maintained in this way.

Where it is practicable to do so, as for example in the conception illustrated in Fig. 4, I have found that it is advantageous to draw off the molten alloy from the furnace into a cooling chamber in which the metal is cooled slowly so that any gases released during the cooling have adequate opportunity to escape from the mass of molten alloy before it is congealed. If this is not done, I have found that gases dissolved by the alloy while it is in the furnace may be released in the form of bubbles so that the casting may have a honey-comb or pumice-like structure and will require remelting to form sound ingots.

As stated above, I have found it advantageous to use direct current rather than alternating current. One important reason for this advantage I believe results from the fact that the flow of hydrogen to the arc tends to carry away the ionized gas and to de-ionize the gas more quickly than would be the case in a still atmosphere, and thus at each half cycle of the alternating voltage a much greater voltage is required to re-start the arc. The result is a tendency toward instability of the arc and also a decrease in the proportion of atomic hydrogen formed, because of the fact that for a substantial portion of the time during which the flow is passing through the arc zone there is no arc actually passing between the electrodes.

If or any reason the use of alternating current is desired there is great advantage in higher frequencies as compared with the lower, because in this way less of the gas will have an opportunity to pass beyond the dissociating influence of the arc, and similarly there is less opportunity for de-ionization during each "out period." Furthermore, it is advantageous to produce an alternating current with as steep as possible a wave front so as to reduce so far as possible the periods during which the arc is extinguished. This may be done, for example, by use of properly designed reactors and especially high reactance transformers as is well known in the electrical art.

Although I have shown two preferred forms of apparatus embodying my invention and adapted for carrying out the process of my invention, it is to be understood, of course, that these are only examples and that many other forms of apparatus may be used and with other conditions of operation than those specified above. For example, it is not essential that the hydrogen be fed through the electrode; and if the electrodes are sufficiently cooled, conductors less refractory than graphite can be used for the electrodes. Likewise, instead of a single pair of electrodes a plurality of electrodes may be used especially in polyphase A. C. circuits. Also the charging may be by blowing comminute material into the reaction zone through the hollow electrode by entraining it in the hydrogen.

This application is a continuation in part of application Serial No. 676,605, filed June 20, 1933.

What I claim is:

1. The method of reducing an oxidized beryllium compound by means of hydrogen which comprises exposing a body of the beryllium compound to an atmosphere of hydrogen, establishing and maintaining an arc in the hydrogen in proximity to the body, said arc being adapted to establish temperatures sufficient to dissociate molecular hydrogen into atomic hydrogen, establishing and maintaining a flow of hydrogen to said body and through a zone in which said temperature of dissociation is established by the arc, removing substantially all water vapor and oxygen from said hydrogen flow before passing it through said zone of dissociation temperature, removing water vapor from the atmosphere around said body, and recovering the metallic beryllium from the resulting vapors.

2. The method of reducing an oxidized compound of beryllium by means of atomic hydrogen formed in a flow of molecular hydrogen directed toward said beryllium compound, which comprises removing from the hydrogen of said flow oxygen in excess of 0.5 mg./l. by weight, including both that which is free and that which is combined with hydrogen, passing such purified hydrogen through a zone in which it is dissociated into atomic hydrogen with conversion of thermal energy into potential chemical energy and forthwith bringing said atomic hydrogen into chemically reactive contact with said compound.

3. The method of reducing an oxidized compound of beryllium which comprises reacting it in an atmosphere of hydrogen by a flow of hydrogen containing atomic hydrogen as the reducing agent and keeping the oxygen in said flow before it reaches the oxidized compound, both as free oxygen and as oxygen combined with hydrogen, approximately in the range 0.8% to 0.2% by weight.

4. The method of reducing an oxidized compound of a metal as defined in claim 2 which further comprises maintaining a temperature on the surface of the oxidized compound against which the hydrogen flow strikes which is sufficient to vaporize the metal of said compound as it is reduced by action of the atomic hydrogen.

5. The method of recovering beryllium from a flow of high temperature hydrogen and water vapor in which it is entrained which comprises exposing said flow to a reducing agent adapted to effect the reduction of the water vapor and thereafter cooling the flow and condensing the beryllium vapor therefrom.

6. The method of recovering beryllium from a flow of high temperature hydrogen and water vapor in which it is entrained which comprises exposing said flow to carbon at a temperature sufficiently high to effect the reduction of the water vapor by the carbon and beyond the limits of temperature at which beryllium carbide is formed and thereafter cooling the flow and condensing the beryllium vapor therefrom.

7. The method of recovering beryllium from a flow of high temperature hydrogen and water vapor in which it is entrained which comprises exposing said flow to sodium to effect the reduction of the water vapor and thereafter cooling the flow and condensing the beryllium vapor therefrom.

8. The method as defined in claim 5 in which the condensation of the beryllium vapor is effected by means of a bath of molten alloying metal maintained near but above its liquidus point.

9. The method of reducing beryllium which comprises passing a flow of hydrogen through an electric arc and to a surrounding mass of an oxidized beryllium compound which is characterized by a loading of the arc relative to the flow of hydrogen of the order of two to six kilowatts per cubic foot of hydrogen per minute.

10. The method as defined in claim 9 in which beryllium compound is supplied to the mass surrounding the arc in coherent bodies of sufficient size to leave interstices for free passage of the hydrogen flow and avoid channeling of the mass.

11. The method of reducing beryllium oxide by atomic hydrogen which comprises flowing hydrogen past an electric arc, briquetting the oxide, feeding the resulting briquettes to a mass around the arc, and passing the flow of hydrogen from the arc over said briquettes and through the interstices between them.

12. The method as defined in claim 11 in which an alloying metal in finely divided form is mixed with the oxide before briquetting whereby the beryllium may be taken up by the alloying metal in the mass of briquettes.

13. The method of reducing beryllium by atomic hydrogen which comprises passing a flow of hydrogen containing the atomic hydrogen as the reducing agent into contact with an oxidized beryllium compound and maintaining the hydrogen pressure in said flow above one atmosphere.

14. The method as defined in claim 13 in which the hydrogen pressure is of the order of 1 to 4 pounds per square inch gauge pressure.

15. The method of reducing an oxidized material with hydrogen in an arc furnace which comprises establishing an arc near a mass of the oxidized material, cooling the arc by a flow of hydrogen therethrough regulated to substantially prevent fusion of the oxidized material by absorbing energy of the arc for dissociation of the hydrogen into atomic state, and passing the atomic hydrogen so formed into the oxidized material whereby to effect reduction thereof without substantial fusion.

16. The method of casting a beryllium alloy which comprises heating the metals in an atmosphere of a reducing gas at a pressure sufficient to avoid boiling off of the beryllium and pouring the molten alloy into molds in a limited atmosphere of gas of the group consisting of inert and reducing gases of pressure sufficient to suppress boiling off of the beryllium, in which the casting is held in fluent condition near the liquidus point for a period sufficient to permit escape of gases released from the metal by cooling.

17. A furnace for reduction of beryllium compounds which comprises a gas tight shell, a hearth positioned within said shell and spaced from the walls thereof, a casing for holding a charge of material over the hearth, and said hearth having a substantial rim within said casing whereon the charge of material may rest and form an arch by sintering or incipient fusion at its under side and means for producing and directing sintering or fusing heat to said under side of said charge of material.

18. A furnace comprising a gas tight shell, a hearth therein constructed and arranged to support a charge of material to be reduced arched over the hearth, a conduit for supplying a flow of reducing gas into the space between the arched charge and the hearth, means for heating the under surface of the arched charge, and means for supporting the hearth adapted to conduct heat therefrom so as to maintain a temperature of the metal thereon substantially below the temperatures on the under side of the arch.

19. In a reducing furnace a gas-tight shell, a mass of refractory insulating material within said shell to protect it from the heat of the reducing zone, a hearth of refractory material within said mass and a wall of sintered refractory material inert with respect to the material charged into the furnace and to the reduction product thereof, which encloses a space above the hearth, and means projecting into the furnace to said space including electrodes, a conduit for supplying a flow of a reducing gas therein, a charging tube, a tapping tube and an off-take tube for removing used gases and gaseous reaction products from said space.

20. In a reducing furnace the combination as defined in claim 19 in which the charging tube enters the furnace from the side and its mouth is adjacent the hearth, whereby it delivers its charge onto the metal pool on the hearth.

21. In a reducing furnace the combination as defined in claim 19 in which the charging tube and the off-take tube are the same, whereby gases from the reaction zone are scrubbed by the charge for condensation of metal vapors and the charge is washed by the residual reducing gas.

22. In a reducing furnace the combination as defined in claim 19 in which the off-take tube is less insulated than the space above the hearth, and extends upward from the hearth, whereby said tube serves as a reflux condenser to return to the hearth any metal which passes into the tube as vapor with the exhaust gases.

23. The method of reducing an oxidized beryllium compound which comprises heating said beryllium compound to a temperature at which metallic beryllium is substantially vaporized, subjecting the compound to a stream of atomic hydrogen, carrying metallic beryllium reduced by said hydrogen in vapor form from the reaction zone in a stream of gases composed predominantly of hydrogen, and condensing metallic beryllium from the hydrogen by an alloying metal.

24. The method as defined in claim 23, in which heating is effected by an electric arc, and hydrogen is introduced into the arc, and metallic beryllium produced thereby is condensed in a molten mass of an alloying metal which comprises one electrode of said arc.

25. The method as defined in claim 23, in which the excess hydrogen and reaction products in gaseous state from the reducing zone are bubbled through a liquid bath adapted to condense the beryllium vapor.

26. The method of producing beryllium which comprises reducing an oxidized compound thereof with atomic hydrogen at a temperature at which the metallic beryllium is vaporized, and condensing the vapors thereof from a carrying stream of residual hydrogen in a liquid bath maintained at a temperature sufficiently low to condense said vapors.

27. The method as defined in claim 26, in which the liquid bath comprises an alloying metal adapted to reduce the vapor tension of the reduced metal.

28. The method of reducing beryllium oxide by means of hydrogen which comprises establishing and maintaining a body of beryllium oxide, establishing and maintaining a flow of hydrogen thereto, establishing and maintaining an arc in the hydrogen in proximity to the body, the temperatures established by the arc being sufficient to vaporize metallic beryllium and to dissociate molecular hydrogen into atomic hydrogen, and recovering the vaporized metallic beryllium.

29. The process of claim 28 wherein a metal capable of alloying with beryllium is in the path of the beryllium vapors leaving the body of the oxide.

30. The process of claim 28 wherein a metal capable of alloying with beryllium is contained in the body of oxide.

31. The method of reducing an oxidized material with hydrogen in an arc furnace which comprises establishing an arc near a mass of the oxidized material in finely divided condition, cooling the arc by a flow of hydrogen therethrough regulated to substantially prevent fusion of the oxidized material by absorbing energy of the arc for dissociation of the hydrogen into the atomic state, and passing the atomic hydrogen so formed into the oxidized material whereby to effect reduction thereof without such fusion thereof as would destroy the extended contact surface due to the finely divided condition of the material.

32. The method of preventing reversal of a reaction involving the reduction of beryllium oxide by atomic hydrogen, which comprises supplying to the vicinity of the reaction carbon in amount adapted to react with water vapor formed by the reduction but less than sufficient to give cumulative formation of beryllium carbide and maintaining the zone of reaction of the carbon with the water vapor at a temperature sufficiently high to effect the reduction of the water vapor by the carbon and also high enough to insure dissociation of any beryllium carbide that might be formed.

PAUL M. DOLAN.